(12) United States Patent
Karbakhsh

(10) Patent No.: US 10,117,492 B2
(45) Date of Patent: Nov. 6, 2018

(54) HAIR DRYER HOLDER SYSTEM

(71) Applicant: Hossein Karbakhsh, Vaughan (CA)

(72) Inventor: Hossein Karbakhsh, Vaughan (CA)

( * ) Notice: Subject to any disclaimer, the term of this patent is extended or adjusted under 35 U.S.C. 154(b) by 247 days.

(21) Appl. No.: 15/297,961

(22) Filed: Oct. 19, 2016

(65) Prior Publication Data

US 2018/0103741 A1    Apr. 19, 2018

(51) Int. Cl.
*G06F 19/00* (2018.01)
*A45D 20/12* (2006.01)
*B25J 9/12* (2006.01)
*B25J 9/06* (2006.01)
*B25J 9/16* (2006.01)
*B25J 9/00* (2006.01)
*B25J 13/06* (2006.01)
*A45D 44/06* (2006.01)

(52) U.S. Cl.
CPC ............ *A45D 20/12* (2013.01); *A45D 44/06* (2013.01); *B25J 9/0003* (2013.01); *B25J 9/0081* (2013.01); *B25J 9/06* (2013.01); *B25J 9/126* (2013.01); *B25J 9/163* (2013.01); *B25J 9/1676* (2013.01); *B25J 9/1684* (2013.01); *B25J 13/06* (2013.01); *A45D 2020/126* (2013.01)

(58) Field of Classification Search
CPC ....... A45D 20/12; A45D 44/06; B25J 9/0003; B25J 9/0081; B25J 9/06; B25J 9/126; B25J 9/163; B25J 9/1676; B25J 9/1684; B25J 13/06
USPC .................................................. 700/245, 257
See application file for complete search history.

(56) References Cited

U.S. PATENT DOCUMENTS 9,408,452 B1 *  8/2016  Al-Khulaifi ............ A45D 20/12
2014/0112791 A1 *  4/2014  Abell .................... F04D 25/084
416/159

\* cited by examiner

*Primary Examiner* — Ronnie M Mancho
(74) *Attorney, Agent, or Firm* — Nasser Ashgriz; UIPatent Inc.

(57) ABSTRACT

The present invention is a hair dryer holder system that can automatically control the movements of a hair dryer mounted thereon in a desired distance according to the movements of the hair brush/comb during the hair styling operation. The hair dryer holder system is a computer aided pivoting device having a tracking system to track the movements of the hair brush/comb and pivot means to provide rotation on orthogonal pivot axis (x, y, or z axis), and can be used to allow the hair dryer mounted thereon to rotate with three degrees of freedom. The hair dryer holder system is programmable to align with the movements of the hair brush/comb in a desired distance and angle to achieve an automatic and hands free hair dryer.

12 Claims, 10 Drawing Sheets

HAIR DRYER HOLDER SYSTEM

FIELD OF THE INVENTION

The present invention relates in general to a hair dryer assembly to hold a hair dryer and in specific, to a hair dryer holder system capable of adjusting and controlling itself automatically by detection of movement of a hair brush/comb.

BACKGROUND OF THE INVENTION

A hair dryer, also frequently called a blow dryer, is used to dry or style the hair. In order to use the hair dryer to style the hair the user typically holds the hair dryer in one hand adjacent to his or her head and a styling brush/comb in the other hand to achieve the hair styling options. The hot or cold air exiting from the outlet of the hair dryer must be blown on the hair curled to the brush while moving from the roots to the hair tip. This will limit the user's ability to style the hair during the drying operation.

A large number of hair dryer supports including stands or hair dryer holders for supporting the hair dryer over the user's head have been disclosed in prior arts. In these devices, the hair dryer may be moved from one position to another position to change the direction of the air flow, or the user have to change his/her position frequently during the operation permitting the flow of air to be directed in a desired direction while leaving the user's hands free.

None of these devices provide an automatically controlled system for hair styling, which automatically adjusts the air flow direction during the styling.

SUMMARY OF THE INVENTION

The present invention is a hair dryer holder system that can automatically control the movements of a hair dryer mounted thereon in a desired distance according to the movements of a hair brush/comb during the hair styling operation.

The hair dryer holder system of the present invention comprises of a supporting means to support the hair dryer holder; a plurality of elongated arms pivotally attached to the hair dryer holder, and a drive assembly using a first motor to move the elongated arms.

The hair dryer holder of the present invention comprises of a circular pivoting means to provide a vertical movement for a hair dryer, wherein the circular pivoting means is driven by a second electric motor; a C-shaped holder to hold the circular pivoting means; and a base pivotally attached to the C-shaped holder to provide 360 degrees rotation, wherein the C-shaped holder is driven by a third electric motor.

The present invention further having a tracking system to track a moving object, wherein the tracking system comprises of a first transmitter attached to the moving object to transmit a position signal and an orientation signal of the moving object; a set of transmitters attached to an upper body of a user to transmit a position signal and an orientation signal of the user; and a receiver to receive the position signal and the orientation signal.

The present invention also has a control panel to manage and calculate the position and the orientation of the moving object and command the electric motors to tilt, rotate and move the hair dryer holder based on the position and the orientation of the moving object.

In hair styling operation, the hair dryer is expected to follow the hair styling brush/comb from a number of different angles. The airflow can be programmed to follow the brush/comb at a specific distance and angle to provide better styling operation.

The hair dryer holder system of the present invention comprises of a computer aided pivoting device with a tracking system to track the movements of the hair brush/comb. In a preferred embodiment, the holder system comprises of a pivoting hair dryer holder with mechanical pivot means to provide rotation on orthogonal pivot axis (x, y, or z axis), to allow the hair dryer mounted thereon to rotate with three degrees of freedom. A circular opening is configured on the hair dryer holder device to receive the tubular barrel of the hair dryer.

In hair styling procedure, the hair dryer moves in different directions and rotates in different angles to align with the hair brush. The pivoting device can be controlled using a controller that can move the pivoting device with three degrees of freedom (3-DoF) namely, pitch, roll, and yaw, and thereby move the hair dryer mounted thereon. The 3-DoF corresponding to the motions, roll, pitch, and yaw are aviation terms. Roll describes the rotation about the x-axis, pitch describes the rotation about the y-axis, and yaw describes the rotation about the z-axis.

The hair dryer holder system of the present invention further comprises of a tracking unit to control the orientation of the airflow of the hair dryer and the orientation of the brush or comb. The tracking unit detects the position of hair brush and then regulates the blowing direction of the hair dryer based on the location and orientation of the brush. The tracking unit tracks the movement of the hair brush by a plurality of sensors mounted on the hair brush/comb and also tracks the movement and orientation of the user by sensing and tracking a plurality of sensors, which are connected to the user. Once the hair brush starts to move, the hair dryer system follows the hair brush/comb based on the orientation of the user, so the system automatically adjusts the position of the blowing air on the hair in a specific distance and angle.

The distance and angle of the airflow based on the hair brush/comb are vital factors during the hair styling procedure. These factors, e.g., distance of the hair dryer to the hair and angle of the hair dryer to the hair, orientation of the user and orientation of the hair brush/comb are considered by the tracking system of the present invention.

In one embodiment, the hair dryer holder system can be used in conjunction with extension arms to provide a broader movement, thereby controlling the movements of the hair dryer mounted on the extension arms. Adjustments made to the extension arms can adjust the direction and angles of the hair dryer.

In one embodiment the hair dryer holder comprises a learning system which learns the previous movement of the hair dryer prior to the hair brush/comb and saves the movement path and implements the learning algorithm for the future hair styling procedure.

It is an object of the present invention to provide a hair dryer holder system which can automatically control the blowing direction according to the position and orientation of the hair styling brush/comb and a user.

It is another object of the present invention to provide an automatic movement of a hair dryer holder in various angles by using a plurality of pivot and rotatable means and a tracking system to direct the air flow to a desired position.

It is another object of the present invention to provide a hands free hair styling system capable to be used with any kind of hair dryers and hair brushes.

It is another object of the present invention to provide a hair dryer holder system which provides a learning system to direct the air flow of the hair dryer mounted thereon to a desired position.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

Figure 1:
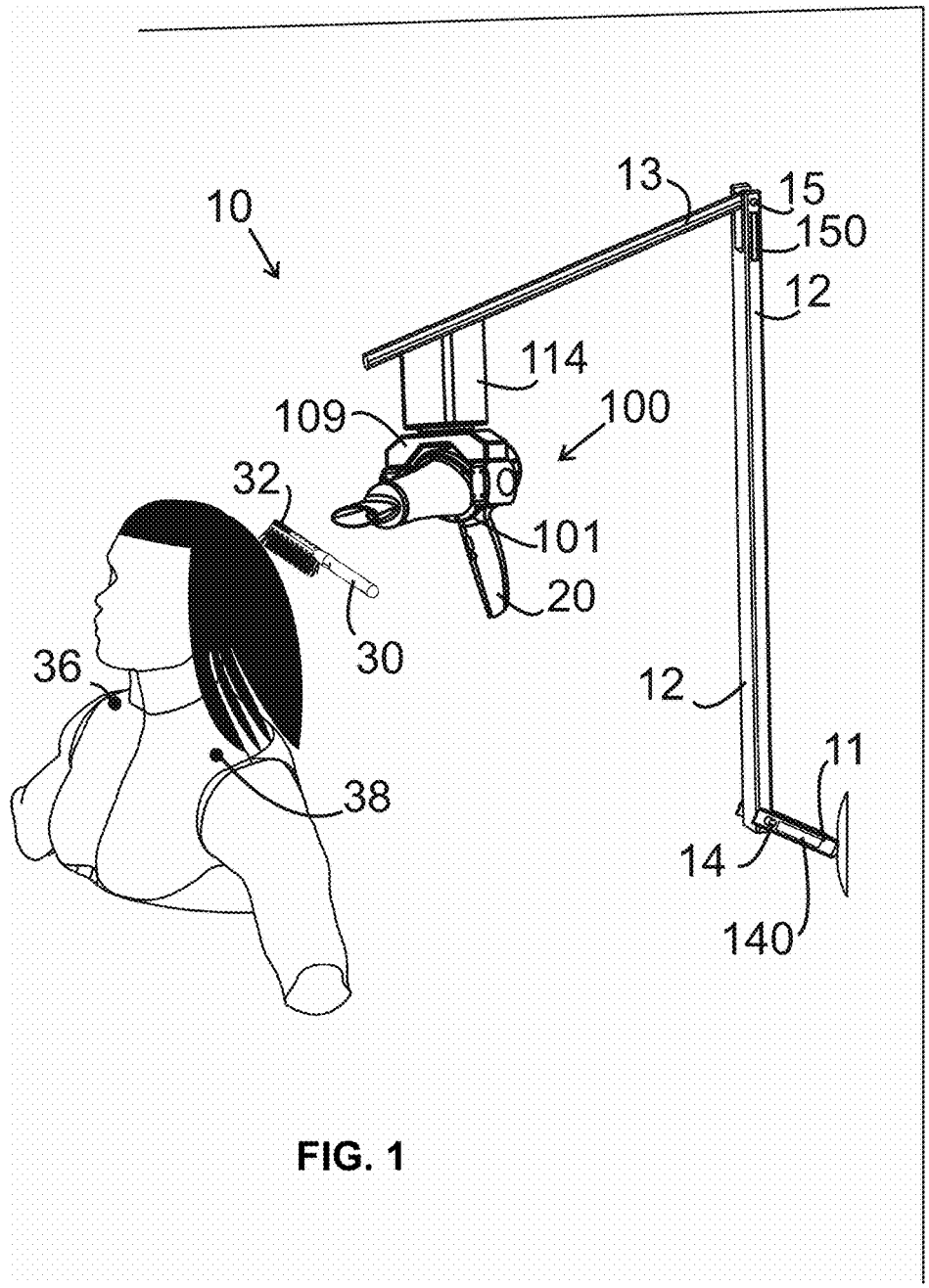
FIG. 1 shows one embodiment of the present invention.
Figure 2:
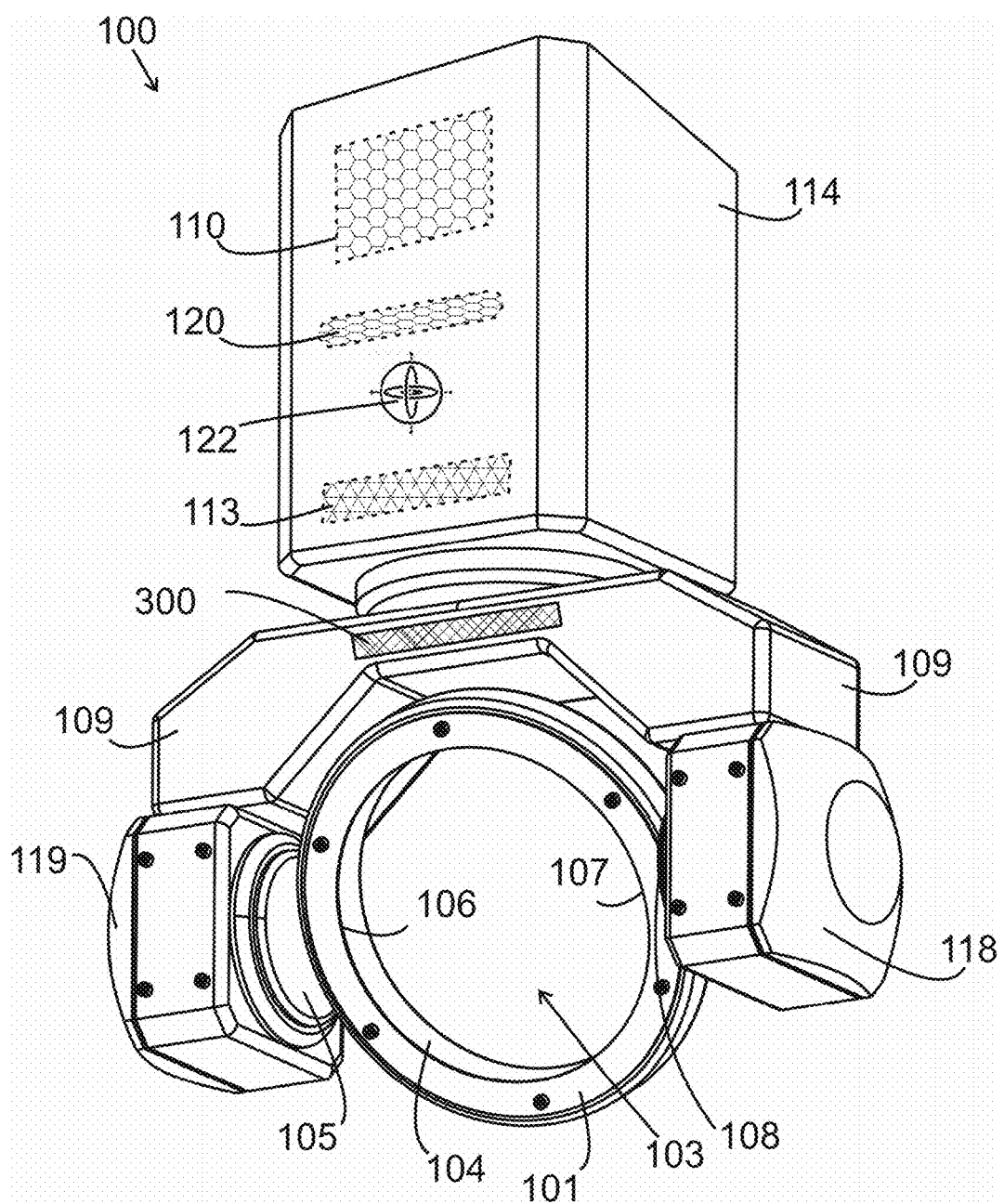
FIG. 2 shows a perspective view of the hair dryer holder of the present invention.
Figure 3:
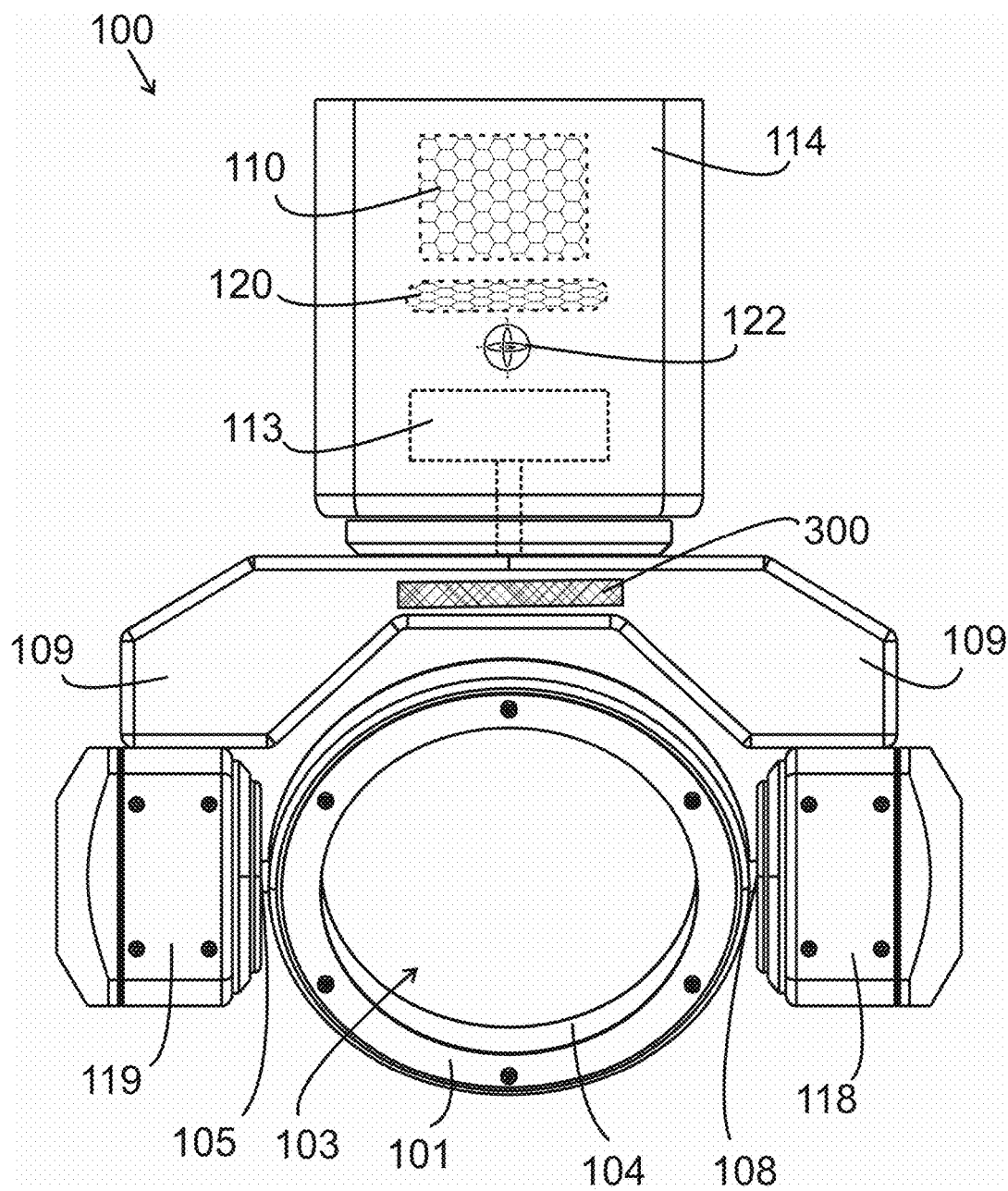
FIG. 3 shows a front view of the hair dryer holder of the present invention.
Figure 4:
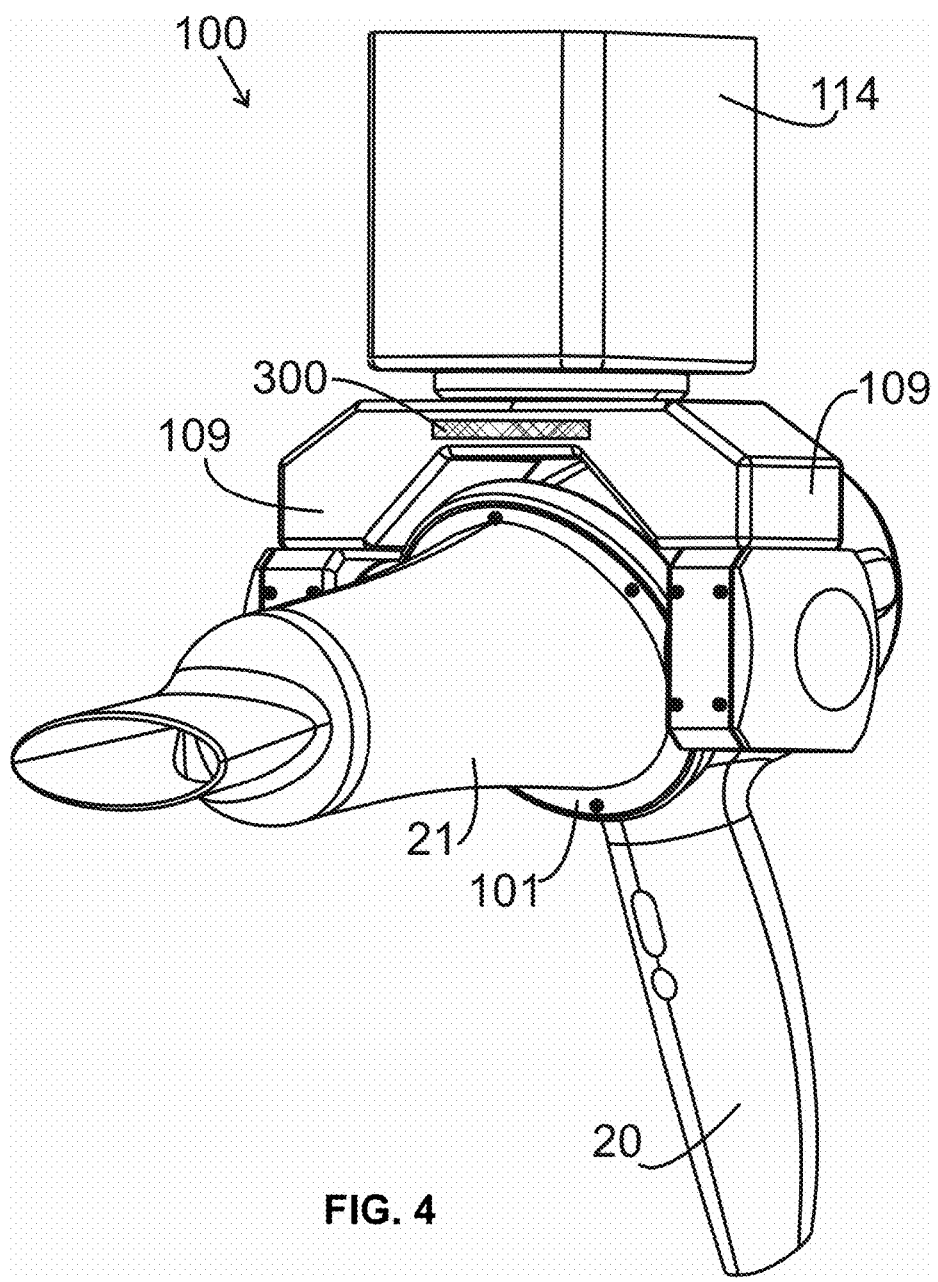
FIG. 4 shows a perspective view of the hair dryer holder of the present invention which holds a hair dryer.

The figures are not intended to be exhaustive or to limit the present invention to the precise form disclosed. It should be understood that the invention can be practiced with modification and alteration, and that the disclosed technology be limited only by the claims and equivalents thereof.

DETAILED DESCRIPTION OF PREFERRED EMBODIMENTS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The hair dryer holder system is preferably configured to provide the hair dryer mounted thereon to move in various degrees of movement similar to the movement of a brush/comb. To achieve this, the system comprises of a pivot means and a rotation means to facilitate full rotation and pivotal movement of the hair dryer.

FIGS. 1-7 illustrate one embodiment of the hair dryer holder system 10 comprising of a first arm 11 pivotally connected to a second arm 12. The first arm 11 pivots around a first pivot point 14 by a first electric motor 140. The second arm is pivotally attached to a third arm 13. The third arm 13 pivots around a second pivot point 15 by a second electric motor 150. The first arm 11, the second arm 12 and the third arm 13 provide adjustable movement for the hair dryer holder device 100. The hair dryer holder device 100 is attached to a distal end of the third arm 13. The hair dryer holder device 100 holds a hair dryer 20 and also provides a vertical and horizontal movement for the hair dryer 20. The holder device 100 comprises of a circular pivoting means 101 to receive the hair dryer 20. A circular opening 103 is configured in the middle of the circular pivot means 101 to receive the tubular barrel 21 of a hair dryer 20.

Again as shown in FIGS. 2-5, the circular pivoting means 101 allows the vertical movement of the hair dryer 20 in various angles. The circular pivoting means 101 is pivotally attached from a right and a left side 106-107 to a C-shaped holder 109, which holds the circular pivoting means 101 in centre. The circular pivoting means 101 pivots around two pivot points 105 and 108. The circular pivoting means 101 provides a vertical movement of the hair dryer 20 mounted thereon. In one embodiment the circular pivoting means 101 comprises a set of motors 118-119 to provide vertical rotation about a single axis (x, y, or z axis), or a combination thereof. In another embodiment, the circular pivoting means 101 can be any pivoting device that can rotate with varying degrees of freedom (e.g., 1-DoF through 3-DoF).

Figures 6A, 6B, 6C:
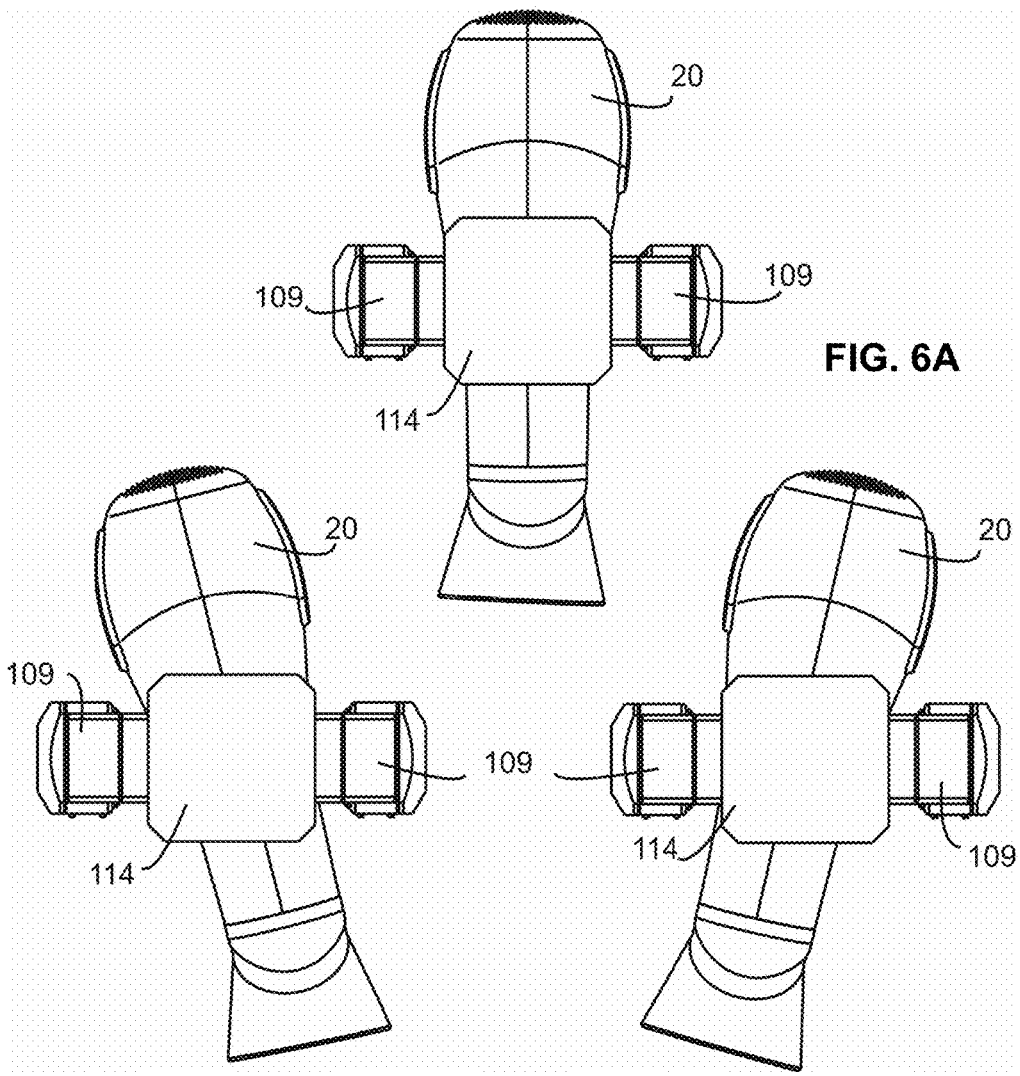
FIG. 6A shows a top view of the hair dryer holder of the present invention which holds a hair dryer.
FIG. 6B shows a top view of the hair dryer holder of the present invention which holds a hair dryer.
FIG. 6C shows a top view of the hair dryer holder of the present invention which holds a hair dryer.
Figures 7A, 7B, 7C:
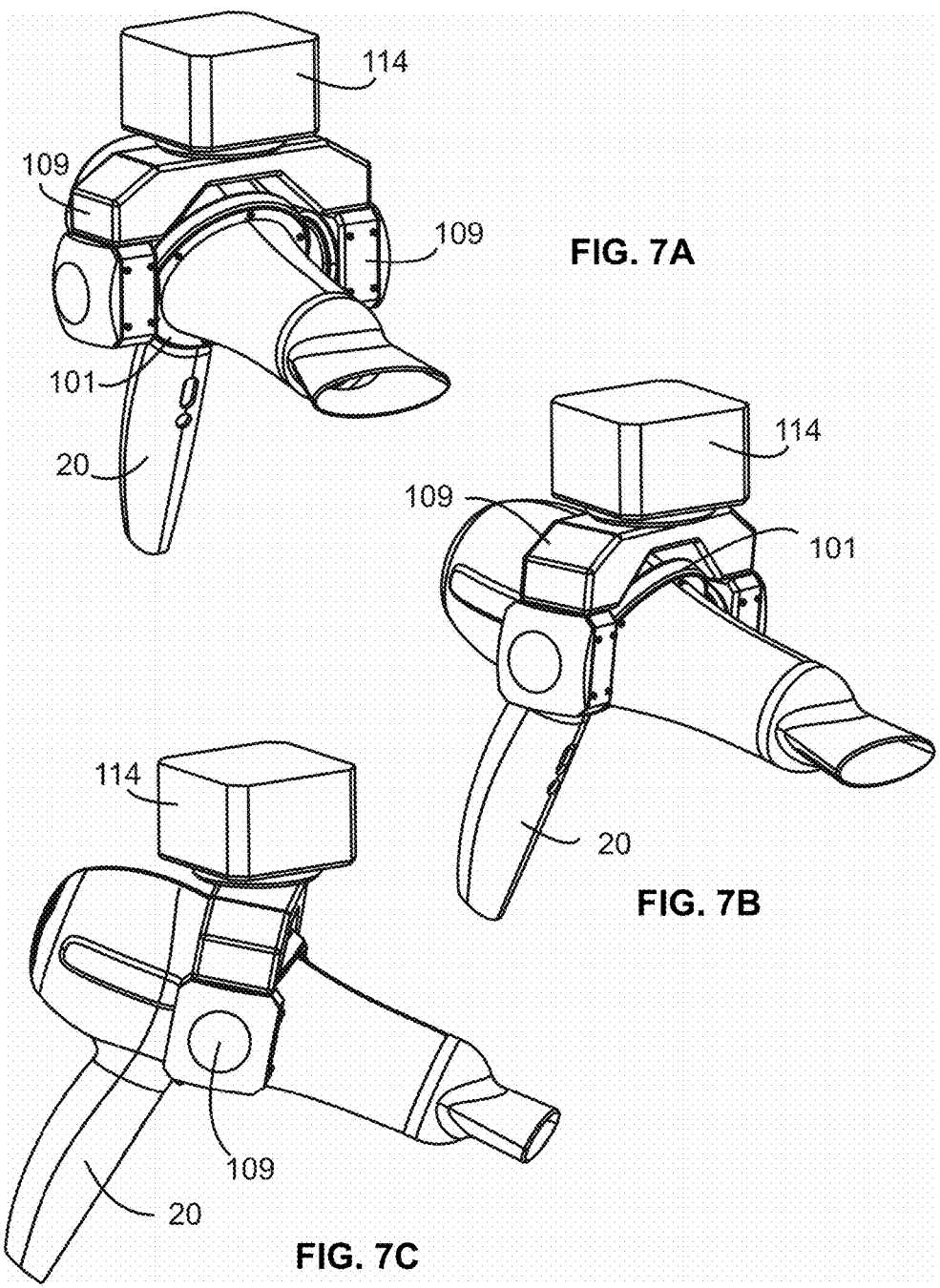
FIG. 7A shows a perspective view of the hair dryer holder of the present invention which holds a hair dryer.
FIG. 7B shows a perspective view of the hair dryer holder of the present invention which holds a hair dryer.
FIG. 7C shows a perspective view of the hair dryer holder of the present invention which holds a hair dryer.

The C-shaped holder 109 is attached to a base 114 and also rotates 360 degrees around the rotation point 116 as shown in FIGS. 6-7. The base 114 is preferably a rectangular part to house operational components therein such as a motor 113 to facilitate rotation of the C-shaped holder 109. Any types of motors can be used to provide 360 degrees rotation for the C-shaped holder 109.

The three degrees of freedom (3-DoF) namely, pitch, roll, and yaw movement of the circular pivoting means 101 and C-shaped holder 109 can be controlled using a control panel 110.

The control panel 110 interacts with all the mechanical part of the hair dryer holder system 10 and can be used to track a hair brush or a hair comb 30 in the present invention. The control panel 110 provides the necessary signals to actuate the motors 113, 118-119 on the circular pivoting means 101 so that a mounted hair dryer 20 can be controlled based on the instructions provided by a computing system. In one embodiment, the present invention has an accelerometer 120 which senses the tilt movement of the hair dryer holder device 100.

The present invention further having a gyroscope 122 to maintain a reference direction for the hair dryer holder during a hair styling operation. The spinal gyroscope 122 can be attached to the hair dryer holder to maintain its orientation during the hair styling operation. The gyroscope 122 monitors the current orientation of the hair dryer holder and when one of the electric motors drives one component of the whole system, maintains the previous orientation by sending a signal to the control panel.

In one embodiment of the present invention, the circular opening 103 has a fastening means to grab the tubular barrel 21 of a hair dryer 20. The fastening means can be selected from the groups of an elastic member 105 in an inner side 104 to hold a hair dryer 20. There are varieties of fastening means are available which can hold the hair dryer 20 in the circular opening.

Figures 5A, 5B, 5C:
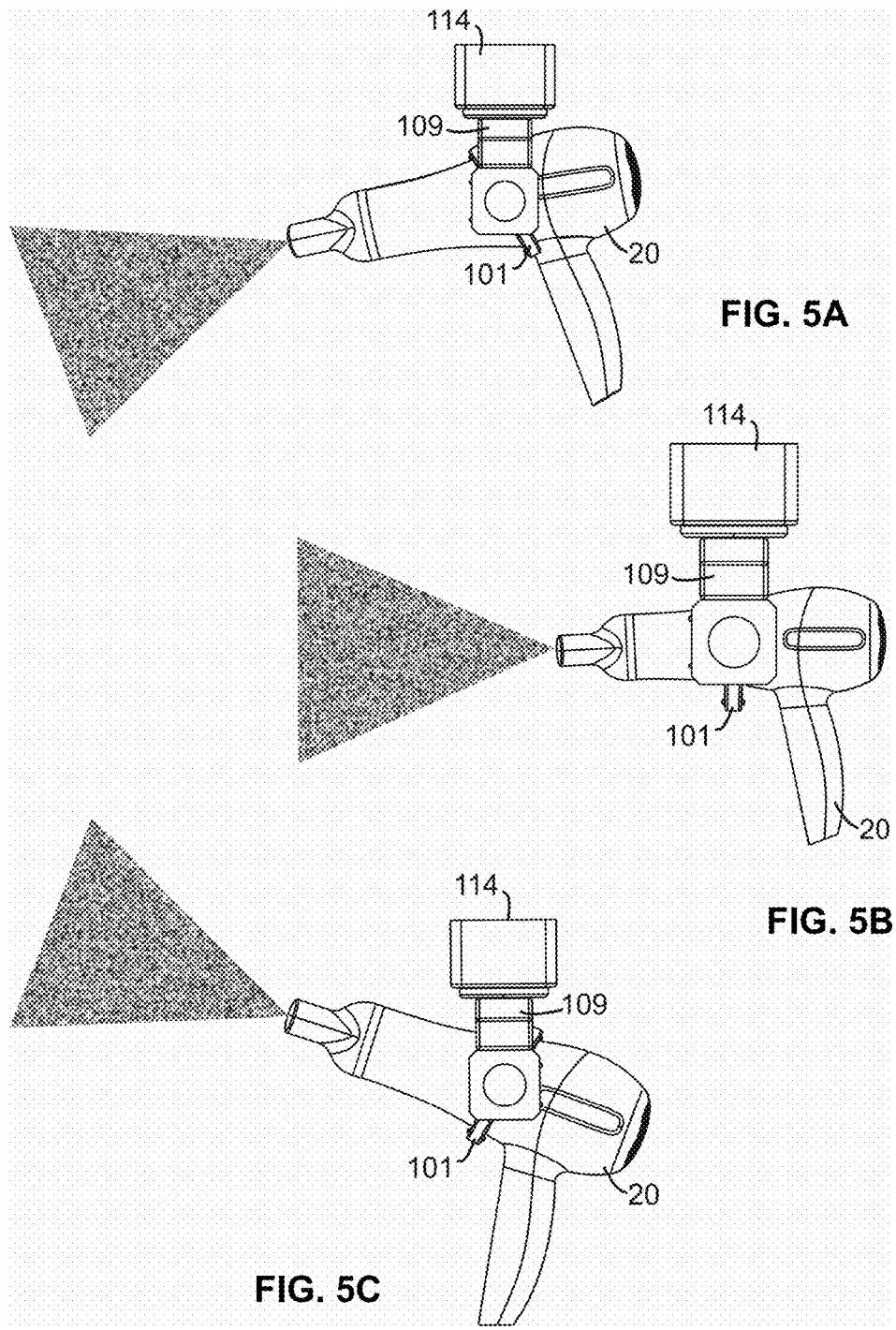
FIG. 5A shows a side view of the hair dryer holder of the present invention which holds a hair dryer.
FIG. 5B shows a side view of the hair dryer holder of the present invention which holds a hair dryer.
FIG. 5C shows a side view of the hair dryer holder of the present invention which holds a hair dryer.

FIGS. 5-7 illustrate various movements of hair dryer holder device 100. In one embodiment the circular pivoting means 101 rotates up and down and the C-shaped holder 106 rotates to right and left. Such movement can be controlled by the control panel 110 which is designed inside the base.

The hair dryer holder system 10 further having a user interface which can be controlled by a computing unit such as a desktop, a laptop, a tablet, a server, a mobile phone, a programmable logic controller, a personal digital assistant (PDA), a personal communicator, a network router or hub, a wireless access point (AP) or repeater, a set-top box, a cloud computing unit, a machine providing SaaS, or a combination thereof. The control panel 110 is provided in the base housing 114 to automatically control the operation of the motors 113, 118, 119, accelerometers 120, and a tracking system.

In one embodiment of the present invention, a learning system can be defined in the present invention to learn the user preference for the hair stylish and perform the same movement for hair styling for the user. The learning program can save and learn the movement of the hair dryer 20 and mimic the exact movement and rotation of the hair dryer for the user in a learning mode.

In the learning process, when the user uses the hair dryer holder device 100 with his/her hand to dry or style his/her hair, the learning system saves all the movement of the hair dryer 20 and learns the user preferences for the hair styling or hair drying. The user can recall the same movement from the learning mode and use the present invention.

In another embodiment of the present invention, the hair dryer holder system 100 further includes a tracking system to automatically follow the motion of the brush 30. The tracking system comprising a tracking device 300 mounted on the hair dryer holder device 100 and a moving transmitter (sensor) 32 mounted on a moving object 30. The moving object can be a brush 30, a bracelet, a ring, or the like. The tracking device 300 tracks the moving transmitter (sensor) 32 that transmits the position and orientation of the moving object.

The tracking device 300 should be aware of the position of the brush in the space near the user's head (x, y, z) and also the orientation of the brush 30. The location and the orientation of the brush 30 are important in hair styling. For example, the brush can be in a same position (x, y, z) but in a different orientation, so the tracking device 300 tracks the location and the orientation of the brush and at the same time, the orientation of the user. For measuring the orientation of the user, two wearable sensors 36, 38 are installed in the user's shoulder.

These two wearable sensors 36, 38 define the user's orientation and also the hair styling boundaries. The tracking system 300 senses two wearable sensors 36, 38 and determines the location of the user's head and the boundaries that the movement of the hair dryer holder device 100 should travel for hair styling or hair drying.

A control panel 110 interacts with main computing system. The user can program the tracking system to set a particular mode or profile, using the target that would be tracked. Tracking system interacts with the tracking algorithms. The tracking algorithm deals with initialization, detection, and tracking of the hair brush 30 and wearable sensors 36, 38 and includes methods or functions that can select the target object.

The control panel 110 uses tracking algorithms and user parameters to control the movement of the hair dryer holder device 100. The control panel 110 controls the physical movement of pivot means 101 based on the instructions. Tracking system can also transmit signals to the control panel 110 to control the motors 113, 118, 119 based on the signals received by sensors 32, 36, 38.

The hair dryer system 100 in accordance with the present invention is fully automatic and can also be programmed to keep the hair dryer 20 within a specific distance of the hair brush 30. The specific distance to make hair glassy and shiny is 2-2.5 inches. The tracking system in the present invention can keep the specific distance in a predefined distance from 2 inches to 5 inches or the user can adjust the distance between the hair dryer and the hair brush in the system by providing the preferred distance in a user interface designed in the hair dryer system.

Figure 8:
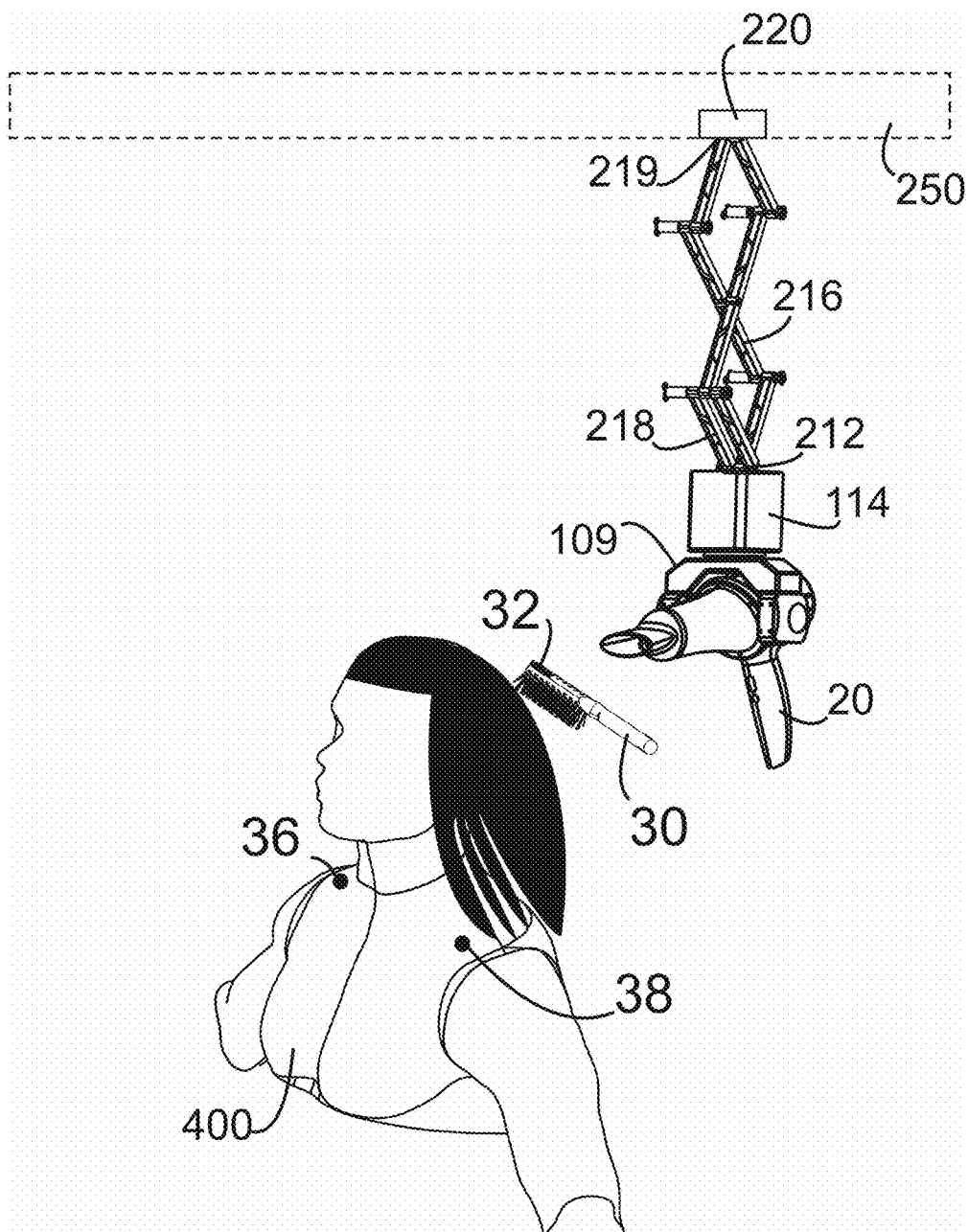
FIG. 8 shows another embodiment of the present invention.
Figure 9:
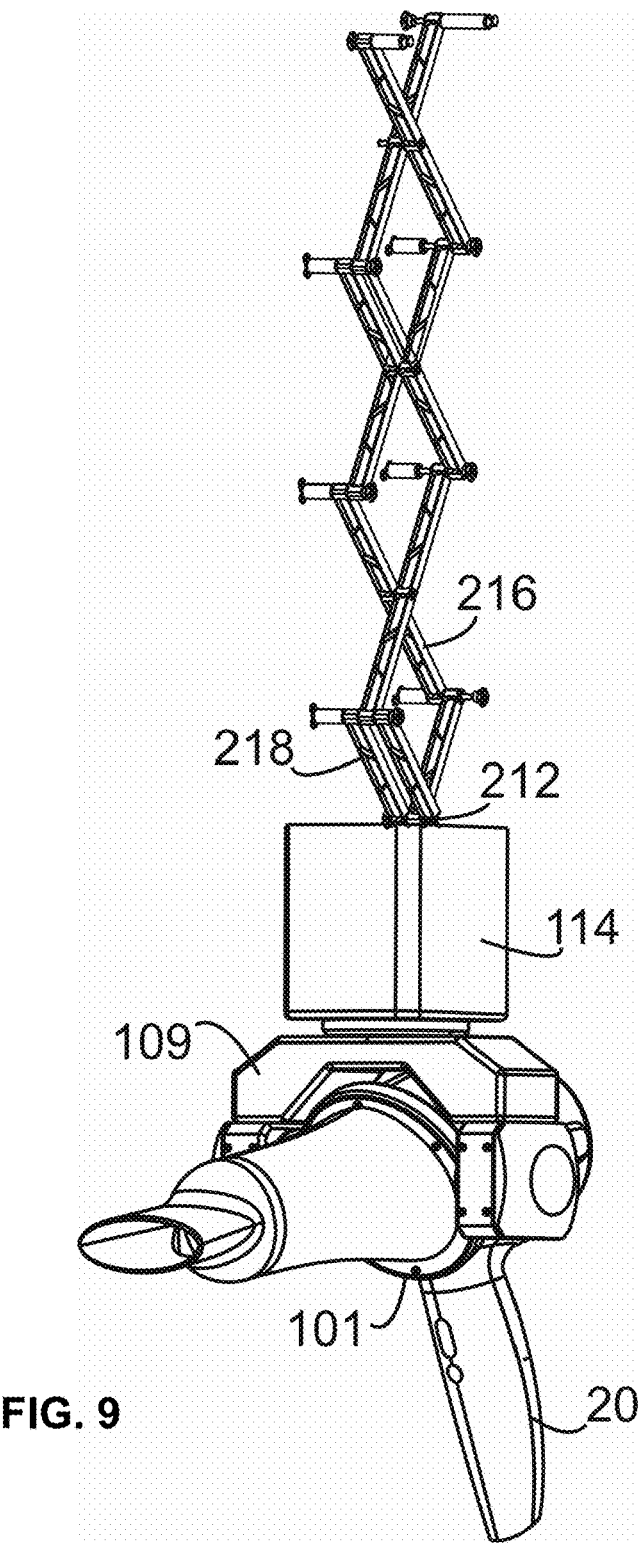
FIG. 9 shows a perspective view of the hair dryer holder of the present invention in another embodiment.

In another embodiment of the present invention as shown in FIGS. 8, 9, the hair dryer holder system 100 may be mounted on an extension arm 216 to provide a broader movement. The extension arm 216 is connected to the bottom part 212 of the base 212 from one side 218 and to a bracket 220 from another side 219. A ball and socket mechanism is mounted to the connection spot of the extension arm 216 and the bracket 220 to permit the extension arm 216 to pivot and extend at any desired position. The bracket 220 have means to mount to a wall or ceiling. Other attaching systems like suction cups can also be used to attach the hair dryer system to the mirror or other surfaces.

Figure 10:
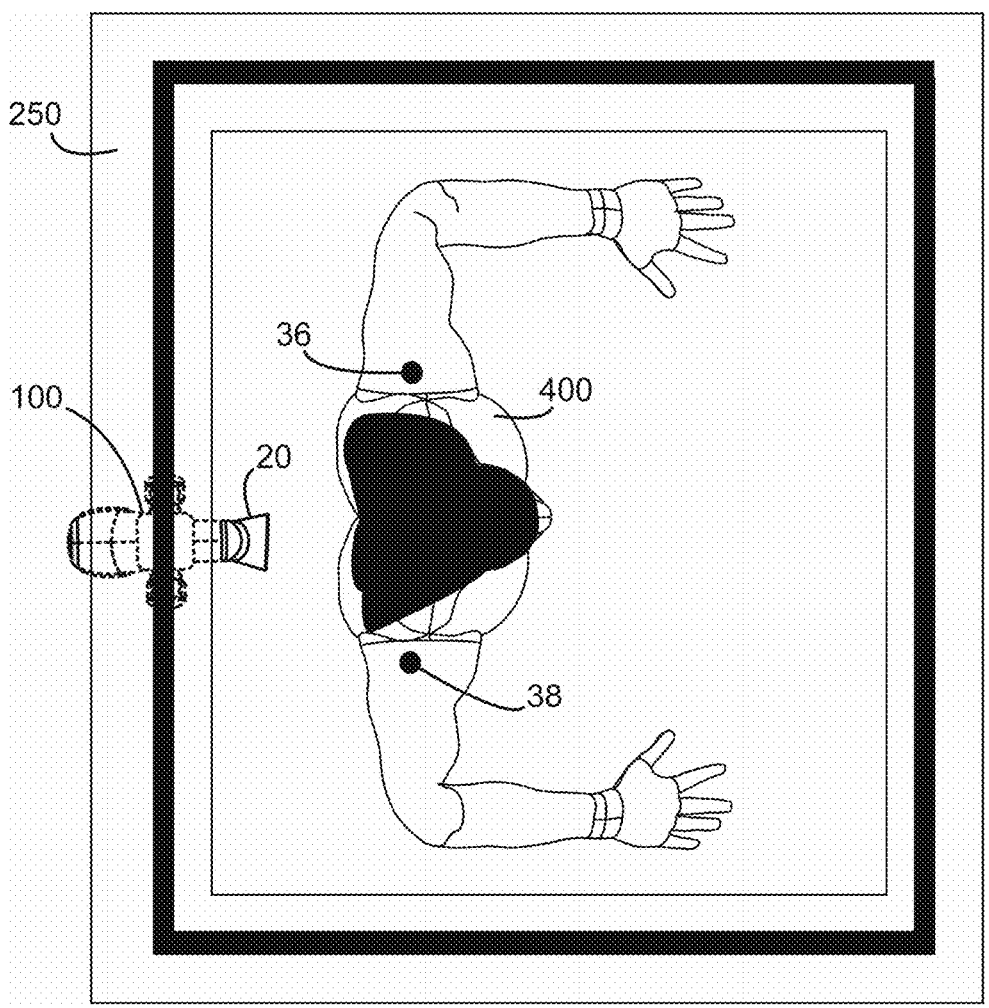
FIG. 10 shows a top view of the hair dryer holder of the present invention in another embodiment.

As shown in FIG. 10, the present invention can be moved in a tetragonal path 250, which is defined around a user 400.

It will be seen that the user may position the hair dryer system so that the hair dryer air flow can be directed in any direction and adjusted with the movement of the hair brush/comb.

The hair dryer holder system is also programmable with airflow controlling. A sensor can be used to control manually or automatically the air blow time in order to maintain a user-set time and speed.

However, it is to be understood that additional or fewer components may be present in certain implementations and furthermore, different arrangement of the components shown may occur in other implementations.

In operation, a person 300 stands in front of a mirror to style his/her hair using the hair dryer holder system 10. The hair dryer holder 10 is mounted to the wall or any surface in front of the mirror and holds the hair dryer 20 so that the person 300 can use both hands to dry and style his/her hair. The hair dryer holder 100 can be fixed in a position so that the tracking device can track the movements of the brush/comb 30 or alike. The hair dryer 20 automatically follows the hair brush 30 so that the air flow may be directed on a desired position. The pivot and rotation means of the system allow the air flow to automatically direct in different angles to align with the hair brush. The system is programmable for any hair styling depending on the angle of the air flow, time of the airflow and the temperature.

In hair styling procedure, the hair dryer has to move in different directions and rotate in different angles to align with the hair brush. The pivoting device can be controlled using a controller that can move the pivoting device with three degrees of freedom (3-DoF) namely, pitch, roll, and yaw, and thereby move the hair dryer mounted thereon.

In another embodiment the tracking unit of the hair dryer holder is an integrated camera mounted on a pivoting device.

The system further includes a plurality of sensors mounted on the hair brush/comb to be tracked by the integrated camera.

The hair dryer holder system of the present invention provides a power system which provides power to the hair dryer and the tracking device, and the motors. An on-off switch may design in the base of the hair dryer holder system to turn the system on and off.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A hair dryer system comprises of
   a. a hair dryer holder to hold a hair dryer;
   b. a plurality of elongated arms pivotally attached to said hair dryer holder, said elongated arms are driven by a first electric motor at a pivot point;
   c. a supporting means to support said hair dryer system on a surface;
   d. said hair dryer holder comprises of
      i. a circular pivoting means to provide a vertical movement for the hair dryer, wherein said circular pivoting means is driven by a second electric motor;
      j. a C-shaped holder to hold said circular pivoting means;
      k. a base pivotally attached to said C-shaped holder to provide 360 degrees rotation, wherein said C-shaped holder is driven by a third electric motor;
   e. a tracking system to track a moving object, wherein said tracking system comprises of
      i. a first transmitter attached to said moving object to transmit a position signal and an orientation signal of said moving object;
      ii. a set of transmitters attached to an upper body of a user to transmit a position signal and an orientation signal of said user;
      iii. a receiver to receive said position signal and said orientation signal, and
      f. a control panel to manage and calculate said position and said orientation of said moving object and command said electric motors to tilt, rotate, and move said hair dryer holder based on the position and the orientation of said moving object.

2. The hair dryer system of claim 1, wherein said moving object being selected from a hair brush, a comb, a ring, and a bracelet.

3. The hair dryer system of claim 1, wherein said set of transmitter are wearable by said user to determine a boundary around said user.

4. The hair dryer system of claim 1, wherein said system further having an accelerometer to determine a tilt movement and an angle of said hair dryer holder during a hair styling operation.

5. The hair dryer system of claim 1, further having a gyroscope to maintain a reference direction for said hair dryer holder during a hair styling operation.

6. The hair dryer system of claim 1, wherein said circular pivoting means further having a fastening means to grab a tubular barrel of said hair dryer.

7. The hair dryer system of claim 1, further having a learning system, wherein said learning system saves all prior movements of said hair dryer and a user preference for a hair styling to mimic said prior movements for the hair dryer.

8. The hair dryer system of claim 1, wherein said tracking system tracks said moving object and keeps a specific distance between said hair dryer and said user's hair.

9. The hair dryer system of claim 8, wherein said specific distance being at least 2 inches to 5 inches.

10. The hair dryer system of claim 1, wherein said system further having a user interface to interact with a user.

11. A hair dryer system comprises of
    a. a hair dryer holder to hold a hair dryer;
    b. a plurality of elongated arms pivotally attached to said hair dryer holder, said elongated arms pivot at a pivot point;
    c. a supporting means to support said hair dryer system on a surface;
    d. said hair dryer holder comprises of
       i. a circular pivoting means to provide a vertical movement for the hair dryer;
       j. a C-shaped holder to hold said circular pivoting means; and
       k. a base pivotally attached to said C-shaped holder to provide 360 degrees rotation.

12. The hair dryer system of claim 11, wherein said circular pivoting means further having a fastening means to grab a tubular barrel of said hair dryer.

* * * * *